(12) United States Patent
Zanski et al.

(10) Patent No.: US 11,778,540 B1
(45) Date of Patent: Oct. 3, 2023

(54) BLE NETWORKING SYSTEMS AND METHODS INCLUDING FILTERING FOR SELECTIVELY COLLECTING AND PROCESSING ADVERTISEMENT DATA

(71) Applicant: Link Labs Inc., Annapolis, MD (US)

(72) Inventors: Ryan Zanski, Annapolis, MD (US); Patrick Li, Annapolis, MD (US)

(73) Assignee: Link Labs, Inc., Annapolis, MD (US)

( * ) Notice: Subject to any disclaimer, the term of this patent is extended or adjusted under 35 U.S.C. 154(b) by 0 days.

(21) Appl. No.: 17/964,570

(22) Filed: Oct. 12, 2022

(51) Int. Cl.
*H04W 4/00* (2018.01)
*H04W 48/04* (2009.01)
*H04W 4/80* (2018.01)

(52) U.S. Cl.
CPC ............. *H04W 48/04* (2013.01); *H04W 4/80* (2018.02)

(58) Field of Classification Search
CPC ............................... H04W 48/04; H04W 4/80
USPC .......................................... 370/329; 455/412
See application file for complete search history.

(56) References Cited

U.S. PATENT DOCUMENTS

| 5,920,287 | A | 7/1999 | Belcher et al. |
| 6,469,628 | B1 | 10/2002 | Richards et al. |
| 7,141,715 | B2 | 11/2006 | Shapira |
| 7,242,294 | B2 | 7/2007 | Warrior et al. |
| 7,411,921 | B2 | 8/2008 | Strong et al. |
| 7,518,500 | B2 | 4/2009 | Aninye et al. |
| 7,973,655 | B2 | 7/2011 | Blinnikka et al. |
| 8,026,814 | B1 | 9/2011 | Heinze et al. |
| 8,368,555 | B2 | 2/2013 | Gilbert et al. |
| 8,712,330 | B2 | 4/2014 | Desai et al. |
| 8,831,627 | B2 | 9/2014 | Aninye et al. |
| 8,849,926 | B2 | 9/2014 | Marzencki et al. |
| 9,328,857 | B2 | 5/2016 | Conte et al. |
| 9,374,667 | B1 | 6/2016 | Jorgensen et al. |
| 9,426,616 | B1 | 8/2016 | Rasband et al. |

(Continued)

FOREIGN PATENT DOCUMENTS

| EP | 3229500 B1 | 1/2020 |
| EP | 3930354 A1 | 12/2021 |

(Continued)

OTHER PUBLICATIONS

Bluetooth Core Specification v 5.0, Dec. 2016, pp. 252-256.

(Continued)

*Primary Examiner* — Marcos Batista
(74) *Attorney, Agent, or Firm* — Charles B. Lobsenz; Brian H. Buck; Potomac Law Group, PLLC

(57) ABSTRACT

Provided are systems and methods including a secure sensor filtering capability within an BLE hub device capable of determining its geographic position and also capable of communicating directly with a cloud services application. The hub device periodically performs BLE scanning for advertisements from devices in proximity to the hub device but only collects and processes advertisement data from end nodes that match the filter requirements configured within the hub device while ignoring advertisements from any end nodes not matching the filter requirements configured within the hub device. In addition, digital leash and custody capabilities are provided with respect to the hub device such that improvements in connection with resource utilization (e.g. power, bandwidth, processor usage) may be achieved.

22 Claims, 8 Drawing Sheets

(56) References Cited

U.S. PATENT DOCUMENTS

| | | |
|---|---|---|
| 9,439,041 B2 | 9/2016 | Parvizi et al. |
| 9,788,167 B2 | 10/2017 | Geng et al. |
| 9,992,633 B2 | 6/2018 | Geng et al. |
| 10,028,105 B1 | 7/2018 | Swart |
| 10,360,421 B1 * | 7/2019 | Farrell ................. H04B 5/0062 |
| 10,408,489 B1 | 9/2019 | Trishaun et al. |
| 2005/0113132 A1 | 5/2005 | Irsheid et al. |
| 2005/0250519 A1 | 11/2005 | Samuel |
| 2007/0001813 A1 | 1/2007 | Maguire et al. |
| 2007/0004426 A1 | 1/2007 | Pfleging et al. |
| 2007/0036119 A1 | 2/2007 | Haddad et al. |
| 2007/0046459 A1 | 3/2007 | Silverman et al. |
| 2009/0092049 A1 | 4/2009 | Hargrave et al. |
| 2010/0131567 A1 | 5/2010 | Dorogusker et al. |
| 2010/0195872 A1 | 8/2010 | Velardo et al. |
| 2012/0311149 A1 | 12/2012 | Trevino et al. |
| 2013/0060351 A1 | 3/2013 | Imming et al. |
| 2013/0065603 A1 | 3/2013 | Hovav |
| 2013/0281084 A1 | 10/2013 | Batada et al. |
| 2013/0314210 A1 | 11/2013 | Schoner et al. |
| 2013/0317944 A1 | 11/2013 | Huang et al. |
| 2014/0149004 A1 | 5/2014 | Best et al. |
| 2015/0003433 A1 | 1/2015 | Sinha et al. |
| 2015/0282113 A1 | 10/2015 | Costa |
| 2015/0296332 A1 | 10/2015 | Lee et al. |
| 2015/0356498 A1 | 12/2015 | Casanova et al. |
| 2016/0012196 A1 | 1/2016 | Mark et al. |
| 2016/0078738 A1 | 3/2016 | Basalamah et al. |
| 2016/0105762 A1 | 4/2016 | Singh et al. |
| 2016/0112886 A1 | 4/2016 | Malik et al. |
| 2016/0117213 A1 | 4/2016 | Arjun et al. |
| 2016/0127883 A1 | 5/2016 | Zhou et al. |
| 2016/0127996 A1 | 5/2016 | Patil et al. |
| 2016/0142868 A1 | 5/2016 | Kulkarni et al. |
| 2016/0183042 A1 | 6/2016 | Weizman et al. |
| 2016/0260301 A1 | 9/2016 | Miller et al. |
| 2017/0041963 A1 | 2/2017 | Edge |
| 2017/0076332 A1 | 3/2017 | Jung et al. |
| 2017/0085417 A1 | 3/2017 | O'Reirdan et al. |
| 2018/0084588 A1 | 3/2018 | Khoury et al. |
| 2018/0160282 A1 | 6/2018 | van de Poll |
| 2018/0160334 A1 | 6/2018 | Deshpande |
| 2019/0277939 A1 * | 9/2019 | Li ......................... G01S 13/878 |

FOREIGN PATENT DOCUMENTS

| | | |
|---|---|---|
| WO | 2016053909 A1 | 4/2016 |
| WO | 2022076511 A1 | 4/2022 |

OTHER PUBLICATIONS

Partial International Search Report and Written Opinion issued for application No. PCT/US2019/023228 dated Jun. 14, 2019.

International Search Report and Written Opinion issued in application No. PCT/US2023/021119 dated Aug. 16, 2023.

* cited by examiner

BLE NETWORKING SYSTEMS AND METHODS INCLUDING FILTERING FOR SELECTIVELY COLLECTING AND PROCESSING ADVERTISEMENT DATA

FIELD OF THE DISCLOSURE

Disclosed embodiments relate to wireless communications, and more specifically, to wireless communication among BLUETOOTH Low Energy (BLE) equipped devices in which a set of defined filters are used on a hub device in order to selectively collect and process advertisement data from other devices which such other devices match pre-set filtering requirements while communications from non-matching devices are ignored.

BACKGROUND

Circa 2009, the Internet was in a stage of its evolution in which the backbone (routers and servers) was connected to edge nodes formed primarily by personal computers. At that time, Kevin Ashton (among others) looked ahead to the next stage in the Internet's evolution, which he described as the Internet of Things ("IoT"). In his article, "That 'Internet of Things' Thing," RFID Journal, Jul. 22, 2009, he describes the circa-2009-Internet as almost wholly dependent upon human interaction, i.e., he asserts that nearly all of the data then available on the internet was generated by data-capture/data-creation chains of events each of which included human interaction, e.g., typing, pressing a record button, taking a digital picture, or scanning a bar code. In the evolution of the Internet, such dependence upon human interaction as a link in each chain of data-capture and/or data-generation is a bottleneck. To deal with the bottleneck, Ashton suggested adapting internet-connected computers by providing them with data-capture and/or data-generation capability, thereby eliminating human interaction from a substantial portion of the data-capture/data-creation chains of events.

In the context of the IoT, a thing can be a natural or man-made object to which is assigned a unique ID/address and which is configured with the ability to capture and/or create data and transfer that data over a network. Relative to the IoT, a thing can be, e.g., a person with a heart monitor implant, a farm animal with a biochip transponder, an automobile that has built-in sensors to alert the driver when tire pressure is low, field operation devices that assist fire-fighters in search and rescue, personal biometric monitors woven into clothing that interact with thermostat systems and lighting systems to control HVAC and illumination conditions in a room continuously and imperceptibly, a refrigerator that is "aware" of its suitably tagged contents that can both plan a variety of menus from the food actually present therein and warn users of stale or spoiled food, etc.

In the post-2009 evolution of the Internet towards the IoT, a segment that has experienced major growth is that of small, inexpensive, networked processing devices, distributed at all scales throughout everyday life. Of those, many are configured for everyday/commonplace purposes. For the IoT, the edge nodes will be comprised substantially of such small devices.

Within the small-device segment, the sub-segment that has the greatest growth potential is embedded, low-power, wireless devices. Networks of such devices are described as comprising the Wireless Embedded Internet ("WET"), which is a subset of IoT. More particularly, the WET includes resource-limited embedded devices, which typically are battery powered, and which are typically connected to the Internet by low-power, low-bandwidth wireless networks ("LoWPANs").

The BLUETOOTH Special Interest Group devised BLE particularly in consideration of IoT devices and applications which do not rely upon continuous connection(s), but depend on extended battery life. A good example of these devices includes a temperature sensor which intermittently provides temperature readings to a collector device that collects such readings. That is, continuous connection between the sensor and collector is not necessary to obtain, for example, such temperature reading at a discrete point in time.

The BLUETOOTH specification governing operation of BLE devices relates definitional roles to each of the above sensor and collector as peripheral and central, respectively.

In accordance with customary BLE networking operations, a peripheral, such as a sensor above, makes its presence known to any central, such as a collector above, merely by continuously "advertising" its presence. In other words, the peripheral continuously sends beacon advertisement messages for recognition by a central that itself decides whether connection with the recognized peripheral should occur. In a BLE environment, such advertising occurs across three advertising channels, or frequencies, so as to reduce instances of interference among signals sent by multiple peripherals.

Yet, existing within such a BLE environment are several impediments to optimal communication between a peripheral device, such as an end node (EN), and a central device, such as an access point (AP).

An example of such an impediment exists in the form of an uncertainty that a peripheral device may experience in actually knowing why its broadcast advertisement has not been acknowledged by a central device. Specifically, such uncertainty exists due to the peripheral's inability to know whether a central device is in a range enabling receipt of its advertisement, or additionally, whether a central device that is in range is simply overloaded such that it has not had sufficient time or capacity to process the peripheral's advertisement.

Yet a further impediment that exists to an optimal relationship between a peripheral and central is congestion across the advertising channels leading to opportunities for signaling collision and missed advertisements, each of which causes a lack of connection. These failures are prevalent in scenarios in which multiple peripherals are co-located, i.e., disposed in or at a same space within a structure such as a building or other venue in which peripheral and central functionality are required or desired.

A still further impediment to BLE networking exists in the fundamental complexity brought about by the conventional BLE peripheral/central relationship. In this relationship, a mobile peripheral which moves out of range of a central such as a first network access point (AP) to which it had previously connected essentially loses any established relationship that such peripheral made with that first AP. In this case, when the peripheral moves within range of another, second AP, this second AP is not immediately able to know, due to the established relationship of the peripheral with the first AP, whether a connection should be made in view of considerations including network configuration, security and authentication. The only basis for informing the second AP whether connection with the peripheral should occur is information it receives from a coordinating application running on the BLE network and that provides information to APs concerning whether connection should be made with a peripheral as a result of its broadcast advertisement. However, by the time the coordinating application learns of the lost connection with the first AP in the above scenario, a considerable amount of time has elapsed before connection information can be, or is, provided by the coordinating application to the second AP in order to allow it to determine that it should connect with the peripheral. Thus, in these ways, it will be understood that enabling connection with a peripheral moving among several APs is not only complex, but further disadvantages exist insofar as increased connection latency and a higher utilization of backhaul due to necessary information that must flow to and from the coordinating application.

Various optimized BLE networking relationships that address and overcome the aforementioned impediments and disadvantages associated with the conventional BLE central/peripheral networking relationship discussed above are disclosed in U.S. Pat. No. 10,264,436 (issued to the assignee of the present application, and hereby incorporated by reference).

In particular, the solutions disclosed in the '436 patent as well as those disclosed in U.S. Pat. Nos. 10,244,373, 10,237, 913 and 10,244,377 (all issued to the assignee of the present application and also incorporated by reference) demonstrate the use of such optimized BLE relationships in connection with various application environments such as, for example, providing healthcare, improving fitness, improving internet connectivity, improving proximity sensing, improving alert systems, improving jobsite monitoring, improving systems controlling access, improving automation and improving systems and methods for tracking the location of assets, such as those, for example, which are to be inventoried, whether in a commercial or residential setting, as well as any other application in which a BLE networking protocol is deployed.

In some use cases, it may be the case that EN accessibility to a given AP may sometimes be hampered to the extent that such accessibility may be deemed non-existent. Any number of factors, including radio frequency (RF) interference and physical barriers may contribute to the inability to achieve the aforementioned tracking and obtaining of information necessary for optimizing one or more of the above application environments. The '436 patent discloses various systems, devices and methodologies which employ an independent capability for allowing the location and other information of an EN to be determined, such that reliance upon an AP and its network connectivity is unnecessary.

The solutions provided in connection with the '436 patent address many concerns regarding difficulties in obtaining and reporting data from EN/peripherals in environments where there may be RF interference and/or competition for limited processing availability at an AP. This is achieved through the use of a EN with the additional capability of communicating directly through backhaul to the cloud so that, for example, location data of both the EN and other devices proximate to the EN can be uploaded without the need for a fixed AP or other central/collector component.

As described more fully in the '436 patent, this enhanced EN is capable of collecting GPS, WiFi and Cell ID positional information and reporting this directly back to the cloud. When the enhanced EN device is located indoors, an indoor positioning network, typically operating via RF signals in unlicensed radio spectrum, can be used to obtain positioning information. Operation of the enhanced EN device is accomplished in a power efficient manner so that battery life can be preserved and battery replacement is needed on a much less frequent basis.

In prior art solutions, the enhanced EN device is typically attached to a single asset or piece of inventory such that the asset can be tracked regardless of where it is. If the asset is located at the factory where there is a local network with APs, tracking can be accomplished via the indoor positioning network. Alternatively, if that asset or piece of inventory is moved away from the factory and thus away from the local network (i.e. put on a truck to be delivered somewhere else), tracking can still occur using the aforementioned GPS, WiFi and/or Cell ID positional information. Location and other payload information (such as temperature or whatever other data the sensor collects) can then be transmitted up to the cloud using, for example LTE-M cellular connectivity.

While these solutions have been quite successful and work well for many use cases, there are certain use cases where these solutions are not particularly cost effective. In particular, when there are many items which typically travel together and which may leave a factory or some other location with a local network, the solution is not particularly cost effective since the enhanced EN device is significantly more expensive than a standard EN not having the enhanced communication and location detection functionalities described above.

An example of such a use case might be an ambulance which contains various items such as medical supplies, drugs, stretchers, defibrillators, and other high value items which are desirable to track and inventory. It is not cost effective to attach an enhanced EN to each of the many items to be tracked for the reasons described above. Alternatively, if a less expensive, standard EN (without communication and location detection functionalities) is attached to each of the items, tracking can occur within the facility where there is a local network via the local APs (e.g. the place where the ambulance is deployed from) but when the ambulance leaves the range of that local network, the individual non-enhanced ENs have no way of determining the location of each of the individual items or reporting any location to the cloud.

SUMMARY

It is to be understood that both the following summary and the detailed description are exemplary and explanatory and are intended to provide further explanation of the present embodiments as claimed. Neither the summary nor the description that follows is intended to define or limit the scope of the present embodiments to the particular features mentioned in the summary or in the description. Rather, the scope of the present embodiments is defined by the appended claims.

An aspect of the embodiments includes an enhanced EN referred to herein as a "Hub" including a locator configured to collect positional information determinative of a location of the Hub, and a communicator operatively coupled with the locator to transmit an identity of the Hub and the positional information directly to a network via a wireless backhaul so as to enable a determination of the location of the Hub by the network, based on the transmitted positional information.

A further aspect of the embodiments includes a Hub device as described above which operates as a gateway device to communicate with one or more standard ENs (BLE tags) in proximity to the Hub device such that the presence of such standard ENs within proximity to the Hub device and/or other payload data associated with such ENs can be provided to the Hub Device and transmitted via wireless backhaul to a network.

A still further aspect of the embodiments includes a secure sensor filtering capability within the Hub device which permits the Hub device to perform BLE scanning for advertisements from devices in proximity to the Hub device but which only collects and processes advertisement data from devices that match the filter bit mask requirements configured within the Hub device while ignoring advertisements from any devices not matching the filter bit mask requirements configured within the Hub device.

A yet further aspect of the embodiments includes a method of operating a Hub device, including determining whether an advertisement message has been received from a BLE source, and if the advertisement message has been received, determining whether the advertisement message was sourced from a device meeting the conditions associated with one or more filters and if so, processing such advertisement message to include reporting data contained in the advertisement message to the cloud based portion of a network either immediately or at a later time.

The method may include, in some cases, using the determined location of the Hub device as a proxy for the location of the BLE source device which is reported to the cloud based portion of the network. The method may include, in some cases, reporting to the cloud based portion of the network additional payload data beyond just location data, which such payload data may be obtained via one or more sensors associated with the BLE source device.

Another aspect of the embodiments described herein may include the ability for a user to configure multiple filters on a single Hub device with each filter capable of providing settings to control device priority, filter match criteria, minimum signal strength, data refresh rate and other characteristics. These filter settings are then implemented in connection with Hub-BLE source device communication so as to selectively permit or reject processing access (and control priority with respect thereto) to the Hub device by each BLE source device transmitting messages in proximity to the Hub device.

A still further aspect of the embodiments of the present invention includes a "digital leash" capability through which the Hub device can combine filtering capability with location determination capabilities to provide location information for BLE source devices which are located in proximity to the Hub device and which meet pre-determined filter requirements. This location information for the matched BLE source devices can then be uploaded to the cloud based portion of the network either immediately or the information can be buffered for uploading in batch with location data associated with other BLE source devices.

Another aspect of the embodiments of the present invention includes a "custody" feature which allows for faster and more power efficient detection of proximate BLE source devices which meet predetermined filtering criteria. In this case, the creation and maintenance of a custody list, typically comprising BLE MAC addresses, of devices previously seen in a scan by a Hub device allows for efficient control and power preservation with respect to both BLE advertisement scans as well as uplink of captured data (location and otherwise) to the cloud based portion of the network.

In certain embodiments, the disclosed embodiments may include one or more of the features described herein.

BRIEF DESCRIPTION OF THE DRAWINGS

The accompanying drawings, which are incorporated herein and form a part of the specification, illustrate exemplary embodiments and, together with the description, further serve to enable a person skilled in the pertinent art to make and use these embodiments and others that will be apparent to those skilled in the art. Embodiments herein will be more particularly described in conjunction with the following drawings wherein.

DETAILED DESCRIPTION

Figure 1:
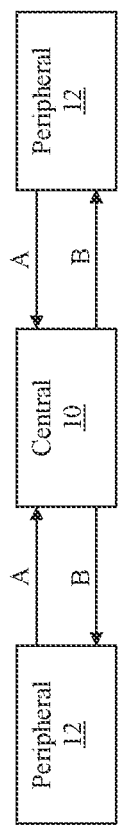
FIG. 1 is an illustration of BLE transmission of a beacon advertisement message between a BLE central and a BLE peripheral, according to the related art.

The present disclosure will now be described in terms of various exemplary embodiments. This specification discloses one or more embodiments that incorporate features of the present embodiments. The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. The skilled artisan will appreciate that a particular feature, structure, or characteristic described in connection with one embodiment is not necessarily limited to that embodiment but typically has relevance and applicability to one or more other embodiments.

In the several figures, like reference numerals may be used for like elements having like functions even in different drawings. The embodiments described, and their detailed construction and elements, are merely provided to assist in a comprehensive understanding of the present embodiments. Thus, it is apparent that the present embodiments can be carried out in a variety of ways, and does not require any of the specific features described herein. Also, well-known functions or constructions are not described in detail since they would obscure the present embodiments with unnecessary detail.

The description is not to be taken in a limiting sense, but is made merely for the purpose of illustrating the general principles of the present embodiments, since the scope of the present embodiments are best defined by the appended claims.

It should also be noted that in some alternative implementations, the blocks in a flowchart, the communications in a sequence-diagram, the states in a state-diagram, etc., may occur out of the orders illustrated in the figures. That is, the illustrated orders of the blocks/communications/states are not intended to be limiting. Rather, the illustrated blocks/communications/states may be reordered into any suitable order, and some of the blocks/communications/states could occur simultaneously.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an" and "the" are intended to include the plural forms as well, unless the context clearly indicates otherwise.

The word "exemplary" is used herein to mean "serving as an example, instance, or illustration." Any embodiment described herein as "exemplary" is not necessarily to be construed as preferred or advantageous over other embodiments. Additionally, all embodiments described herein should be considered exemplary unless otherwise stated.

The word "network" is used herein to mean one or more conventional or proprietary networks using an appropriate network data transmission protocol, or other specification and/or guidelines which may be applicable to the transfer of information. Examples of such networks include, PSTN, LAN, WAN, WiFi, WiMax, Internet, World Wide Web, Ethernet, other wireless networks, and the like.

The phrase "wireless device" is used herein to mean one or more conventional or proprietary devices using radio frequency transmission techniques or any other techniques enabling the transfer of information. Examples of such wireless devices include cellular telephones, desktop computers, laptop computers, handheld computers, electronic games, portable digital assistants, MP3 players, DVD players, or the like.

BLE networking enables detection and connection among devices that generally do not require continuous connection therebetween in order for an exchange of information in the form of data to occur. Yet, such devices depend upon extended battery life in order that the opportunity for such an exchange may continue to reliably exist. The devices themselves vary in their construction, whether, for example, a sensor, a cellphone, a network access point (AP), or some other object configured to enable and/or provide BLE communication(s) and which is either stationary or mobile, such as a BLUETOOTH tag. In the context of BLE networking, such devices are currently prescribed, for example, by the BLUETOOTH Core Specifications 4.0 and 5.1 and are compatible with IEEE 802.15.1, as appropriate.

Typically, in the context of BLE communications, one or more of these devices assume the roles of a central 10 and a peripheral 12, as shown in FIG. 1. A peripheral is generally understood as a device which merely broadcasts, or advertises, its presence toward another device referred to as a central, with the intent that such presence be detected by that central. The broadcast generally takes the form of a beacon advertisement message transmitted as a radio frequency (RF) signal. Should detection occur, it is also generally understood that it is the central that determines whether a connection with the peripheral should occur. If the answer to that determination is in the affirmative, the central establishes a connection, and also prescribes all conditions under which any connection with a peripheral is to be made. The directional flow of transmission of the beacon advertisement message comprising a RF signal from the peripheral is shown by arrows "A," in FIG. 1, while the directional flow of establishment of a connection with the peripheral by the central is shown by arrows "B." Such a scheme renders BLE networking susceptible to the many shortcomings discussed hereinabove.

Thus, in an effort to address those shortcomings, embodiments disclosed herein reverse the directional flows of transmission of the beacon advertisement message and connection so as to thereby reverse the roles of a conventional central and a conventional peripheral, and make such role reversal applicable to appropriate nodes in a BLE-enabled network.

Figure 2:
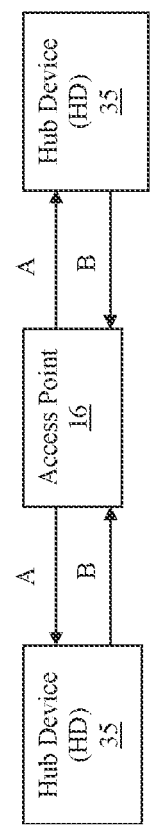
FIG. 2 is an illustration of BLE transmission of a beacon advertisement message between a BLE end node (EN) and a BLE access point (AP), according to embodiments disclosed herein.

FIG. 2 illustrates such reversal of roles insofar as each of exemplary battery-powered BLE Hub Devices (HDs) 35 are responsible for detection of a beacon advertisement message transmitted from an exemplary battery-powered BLE access point (AP) 16 in the direction of arrows "A," and moreover, whereby such HDs 35 are solely responsible for evaluating and/or determining whether to initiate and/or establish a BLE connection with the AP 16, as shown in the direction of arrows "B." That is, in no way is the AP 16 responsible for evaluating and/or determining any aspect or aspects of whether to make a connection between a respective AP 16 and a respective HD 35, and whereas such aspect or aspects, rather, are solely evaluated and/or determined by the HD 35 so that the HD 35, itself, is enabled to then solely initiate and/or establish the aforementioned connection, if doing so is deemed appropriate by the HD 35. Herein, the term, "initiate" means taking any initial steps or enacting any initial procedures, and the terms, "establish," or "established" mean taking any steps or enacting any procedures related to whether to cause and/or maintain a connection between an AP 16 and an HD 35, and thereafter making and/or maintaining such connection.

Figure 3A:
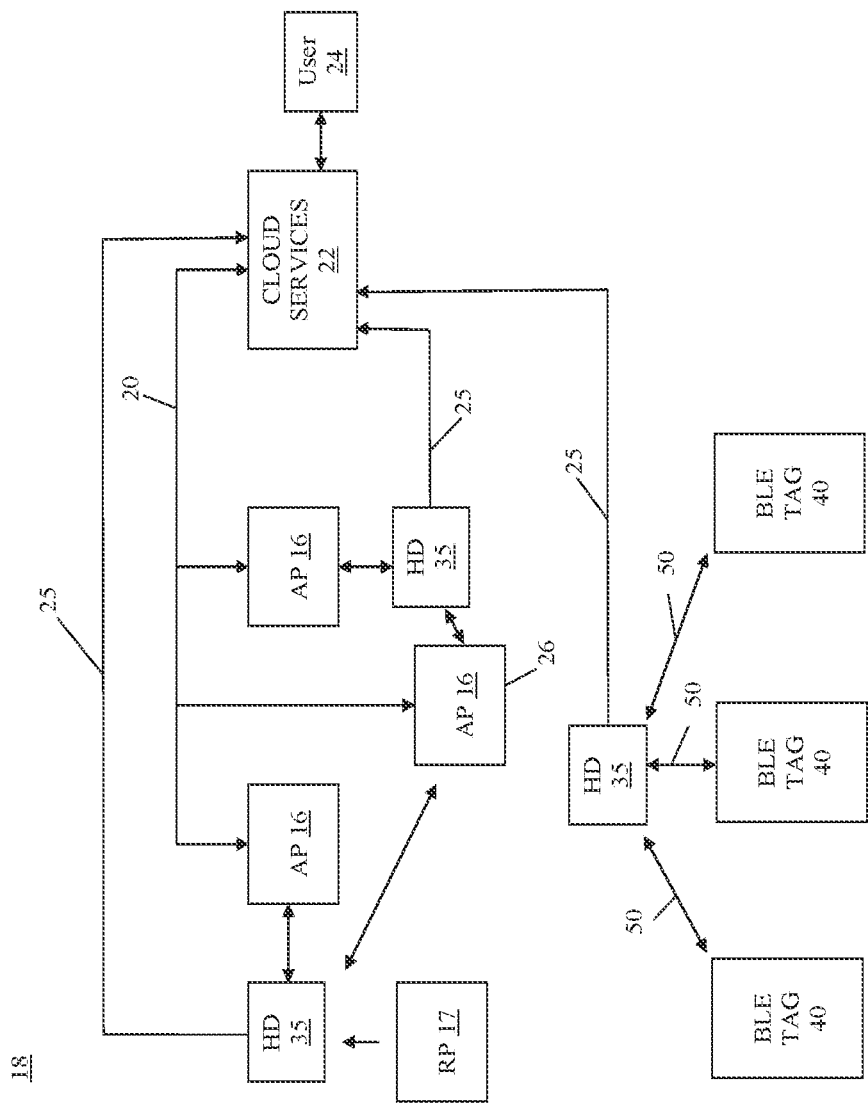
FIG. 3A is an illustration of BLE-enabled network in accordance with the teachings of the present invention and illustrating connectivity between HUB Devices and BLE tags within such network.
Figure 3B:
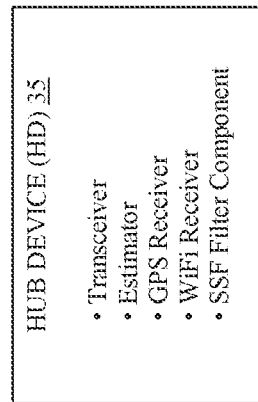
FIG. 3B is an illustration of a Hub Device (HD) in accordance with FIG. 3A.

FIG. 3A illustrates a BLE-enabled network and communications system thereof and FIG. 3B is an illustration of an HD 35 in accordance with FIG. 3A. Throughout, it is to be understood that an HD 35 does not, at any time, transmit to an AP 16 its location, but rather, the location of the HD 35 may be determined by relative association of one or more APs 16 and/or RPs 17 should they be detected by the HD 35. As further discussed below, HD 35 is further capable of determining its own location when outside the RF range of any APs 16 and/or RPs 17.

Specifically, FIG. 3A illustrates a BLE-enabled network 18 and communications system thereof according to the present embodiments in which HDs 35 detect a received signal strength (RSS) of all beacon advertisement messages transmitted from the APs 16 and RPs 17, solely determine proximity or use phase ranging to calculate position with respect to the APs 16 and RPs 17, and further, solely initiate and establish all connections therebetween the HDs 35 and APs 16, in response to having evaluated and/or made a decision with respect to, for example, such RSS, information contained in the beacon advertisement message, and/or other information, as more fully described in the '436 patent. Once a connection between an HD 35 and an AP 16 is made, data such as, optionally, identifying information, other than location information, of the HD 35 and identifying information of, other than the connected AP 16, the most proximate AP 16 or RP 17, and contained information of the HD 35 including, for example, sensory information thereof, may be transferred to the respective AP 16 for delivery through a backhaul 20, implemented by a cellular, WiFi, or Low-Power, Wide-Area Network (LPWAN) configuration, to a cloud service 22 for transfer to an end user terminal 24, such as a personal computing or other electronic device enabled to convey the aforementioned information.

Pertinent, unique identifying and/or location information of the APs 16 and RPs 17, such as their media access control (MAC) address, is included in each of their transmitted beacon advertisement messages and are known to the cloud service 22. Such cloud service 22 includes any one of available data and connectivity platforms to allow users of nodes within network 18 to, for instance, manage and distribute information pertinent to the nodes and/or information desired in the administration of the nodes. An example of such a platform is CONDUCTOR, available from Link Labs, Inc. of Annapolis, Md.

As mentioned, HD 35 may transmit to the cloud service 22 its own identity in the form of, e.g., its MAC address, and other collected information, along with identifying information of the AP 16 or RP 17 which is most proximate to the HD 35. Alternative embodiments in which phase ranging is used to determine the location of HD 35 are also possible. Such phase ranging techniques are described in U.S. Pat. No. 10,985,787 which is assigned to the assignee of the present application and is hereby incorporated by reference.

In this regard, such transmission may occur through one of two ways. Firstly, an HD 35 may transmit independently of an AP 16, through use of its own network connection capability. To do so, each HD 35 is equipped with appropriate hardware and/or software so as to send and receive information via an available backhaul 25. These components of HD 35 are shown in FIG. 3B.

The backhaul 25 may comprise a LPWAN configuration, or be embodied as a network operated by a cellular provider, such as, for example, VERIZON, for delivery and receipt of information directly to and from network 22. When in the form of the LPWAN configuration, each HD 35 comprises an LPWAN transceiver and/or software compatible with, for example, the LPWAN solution known as SYMPHONY LINK, and available from the aforementioned Link Labs, Inc., though other solutions are also contemplated. The LPWAN solution may also employ an LTE-M or narrow-band iOT protocol.

In this way, backhaul 25 may be implemented so as to reduce the costs and occasional unavailability of cellular transmission. When in the form a cellular network, each HD 35 comprises a cellular transceiver in accordance with, for example, 5G-NR, Global System for Mobiles (GSM), or Long-Term Evolution (LTE), including Cat-M1 or NB-IoT. Secondly, an HD 35 may transmit through a connected AP 16.

Further, it is to be understood that, while communications between an HD and AP 16 are discussed herein in the context of the BLE protocol, it is contemplated that such communication may also be optionally achieved according to another wireless protocol, as appropriate. Also, it is to be understood that HD 35 and AP 16 are exemplary of first and second network nodes, respectively, which may be similarly configured as are HD 35 and AP 16 to carry out communications with respect to the BLE networking described herein and/or according to the other, appropriate wireless protocol discussed above.

In an exemplary case in which a respective HD 35 is mobile, the HD 35 is configured with a locator comprising an estimator implemented by all appropriate software and/or hardware for estimating proximity to a given AP 16 or RP 17, based on RSS, and is also configured with appropriate software and/or hardware for performing all operations associated with initiating and/or establishing a connection with an AP 16. Details of the estimator used in connection with this functionality is more fully described in U.S. Pat. No. 10,264,436 which is assigned to the assignee of the present application and is hereby incorporated by reference.

In connection with the above, the HD 35 is further configured to self-transmit to the cloud service 22 its own identity, e.g., its MAC address, collected information applicable to an above-discussed application environments, and positional information, i.e., information which is determinative of a location of the HD 35 without reference or attribution to an AP 16 or RP 17, along with any other information pertinent to the HD 35 as described herein. To do so, HD 35, as is shown in FIG. 3B, includes a communicator comprising a transceiver, such as, for example, either a CAT-M1 or other cellular enabled modem, or a LPWAN compatible construction, each of which is respectively operable with backhaul 25. Operatively connected with the communicator is a locator comprising one or more of the aforementioned estimator, a Global Positioning System (GPS) receiver and a WiFi receiver. Optionally, each of the above modem, estimator, and receivers may comprise a system on a chip (SoC), so as to include a microprocessor (not shown).

Because HD 35 includes the above-discussed cellular modem, positional information of the HD 35 may be determined by cloud service 22 according to the cellular ID (CID) of the base transceiver station (BTS) with which the HD 35 is in communication. That is, when transmitting its positional information to the cloud service 22, the CID is delivered upstream to the cloud service 22, which is then enabled to access a mapping of the BTS as administered by a cellular provider with rights to the BTS, such as VERIZON, AT&T or similar network operators. With this mapping, a relative location of the HD 35, comprising the latitude and longitude of the communicating BTS, may be learned and attributed, by cloud service 22, to any HD 35 that transmitted information to the cloud service 22 via its cellular modem.

When configured with a GPS receiver, HD 35 determines its positional information as latitude and longitude as would, for example, a smartphone or other computing device executing GOOGLE MAPS or another known global positioning application.

When configured with a WiFi receiver, HD 35 is enabled to obtain, for one or more wireless local area networks (WLANs), such as a WiFi network or networks, positional information including received signal strength indicators (RSSIs) for detected networks, service set IDs (SSIDs) representing a name of a particular WiFi network, and basic service set IDs (BSSIs) representing the MAC address of access points within the detected network. With this information, and particularly BSSIs for detected networks, the HD 35 is then able to communicate detected addresses to cloud service 22. Cloud service 22 then coordinates access to positioning databases for WiFi networks, including, for example, that which is administered by GOOGLE. Through this coordination and matching of these addresses, a relative location of the HD 35, comprising a latitude and longitude for the detected addresses, may be determined and attributed, by cloud service 22, to the HD 35.

When configured with any combination of location determining software and/or hardware including the estimator, GPS receiver and the WiFi receiver, as described above, cloud service 22 is configured to calculate and determine the relative location of the HD 35 within a predetermined tolerance of positional latitude and longitude coordinates. Such determination may occur, for instance, in a case in which the cloud service 22 determines a location of an HD 35 using a combination of, for example, GPS coordinates and WiFi derived coordinates, though other combinations are contemplated. For example, such another combination may comprise a known location of the most proximate source of received beacon advertisement messages, GPS coordinates and WiFi derived coordinates.

In one or more embodiments, operability of the communicator and locator may be executed according to an application comprising a set of computer-readable instructions configured to be stored on and accessible by a computing device, such as a smartphone or other personal computing device, for execution thereby. This way, such a computing device may be transformed to comprise the HD 35 so as to leverage the operating system, GPS, WiFi and other data collection capabilities thereof.

U.S. Pat. No. 10,264,436, which is assigned to the assignee of the present application and is hereby incorporated by reference, describes a sequence of self-transmission of an HD 35 (noted as an EN 14 therein) including association of a respective HD 35 to a respective AP 16 or RP 17.

The '436 patent also describes situations in which connection to one or more APs 16 is available and how those situations are handled. On the other hand, if such connection is unavailable, then a mobile HD 35 will self-transmit using backhaul 25. This way, an HD 35 is configured to optimize its power consumption and use of cellular resources, which can oftentimes be quite expensive, by seeking to first detect a BLE connection to the cloud service 22 via backhaul 20, and only thereafter in the absence of that connection, resort to self-transmission via backhaul 25.

Once connected, the HD 35 may then transfer its own identifying information, other than location information, and identifying information of the most proximate AP 16 or RP 17. In this way, when information of an AP 16 other than the connected AP 16 is not transferred, it will be understood that the connected AP 16 is most proximate to the HD 35. Concurrently with the transfer of the above information, the HD 35 may also transfer one or more of its contained information including sensory information, access information, notification information, alarm information, and any other status and/or content information thereof as may be applicable to its particular configuration. For instance, it is contemplated that HD 35 may transfer any of the aforementioned types of information so as to be applicable to such environments including a workplace or other type of commercial environment in which commerce is a purpose, a residence, and a medical facility or other facility in which tracking of persons or objects is necessary and/or desired.

In these contexts, an HD 35 may be configured to include all appropriate hardware and/or software for the detection of temperature, light, sound, pressure, humidity, density, moisture, acceleration, voltage, current, material content level and pressure, motion, proximity, magnetism, rotation, orientation, velocity and/or deviation from original condition.

The following example describes instances of associating a particular Hub device (HD) 35 to a particular access point (AP) 16 in instances in which the HD first seeks to connect to the cloud services 22 via BLE protocol, prior to attempting self-transmission, so as to conserve resources of the HD 35 and reduce the cost of network connection. Further, such examples are set forth in the context of the BLE-enabled network 18 of FIG. 3A and with the exemplary understanding that an HD 35, which may be attached to or associated with a particular object, is seeking association with a BLE AP 16 that is configured to report information of the HD 35 to an end user 24 via backhaul 20 and cloud services 22.

In a first instance, it is contemplated that HD 35 is attached to an object, such as a hospital bed for which it is desirous to know the location thereof at any given point in time when it is moving throughout a hospital environment. Thus, assume that the hospital bed, with HD 35 attached thereto, is transient throughout the hospital, moving from floor to floor and from room to room, as the case may be when a patient is to undergo a particular procedure. At any given point in time, as the bed moves from one location to the next, its whereabouts may be tracked through monitoring achieved by the BLE communications system disclosed herein.

More specifically, as the hospital bed may move throughout a particular floor, it contemplated that it will move among a number of APs and RPs whose location is known to the hospital network. As that travel occurs, the HD 35 attached to the bed will scan for beacon advertisement messages transmitted from the various APs and RPs. Upon receipt of the transmitted signals, HD 35 is configured to conduct the MAP estimation discussed in U.S. Pat. No. 10,264,436 and calculate a highest confidence value for the AP or RP that is in closest proximity at a given point in time. HD 35 is further configured to connect with a particular connectable AP having a highest connection value, as shown by the exemplary double arrows extending between an exemplary HD 35 and AP 16 of FIG. 3A, so that the identifying and other information of the closest proximity AP may then be transferred to the end user. In this way, as the bed and attached HD 35 may continue to move, the process of determining proximity of HD 35 to both APs and RPs continues until, optionally, such point in time when the bed and attached tag are stationary such that identifying information of a further, different AP or RP need not be reported.

More particularly, and continuing with the example scenario above, the attached HD 35 is alternatively, and optionally, configured to conduct a scan of broadcasting APs and assess their UUID and token information so as to qualify those APs to be included on a detection list resulting from the scan and from which connection with a specified one thereof will occur in order to transfer the HD 35's identity, identity information of the AP to which the HD 35 is most proximate, and/or contained information of the HD 35 to an end user. Once this detection list is compiled and scanning is completed, embodiments of the present disclosure contemplate the HD 35 being configured to initialize a connection list of APs, from among the APs compiled on the detection list. Once initialized, the HD 35 is further contemplated to conduct a determination of whether an AP is connectable to the cloud services 22 via backhaul 20 so as to be able to transfer information of HD 35 to an end user desirous of knowing the location of the hospital bed. Each connectable AP is then evaluated as to its associated connection value in accordance with the teachings of the '436 patent listed above.

In these ways, it will be understood that the embodiments disclosed herein optimize the efficiency of a BLE-enabled network by, at least, reducing power consumption of network resources. It will likewise be understood that the embodiments disclosed herein enable a determination of the relative location of an HD 35 in view of its proximity to an access point or reference point, whether or not such access point is connectable or non-connectable.

Figure 4:
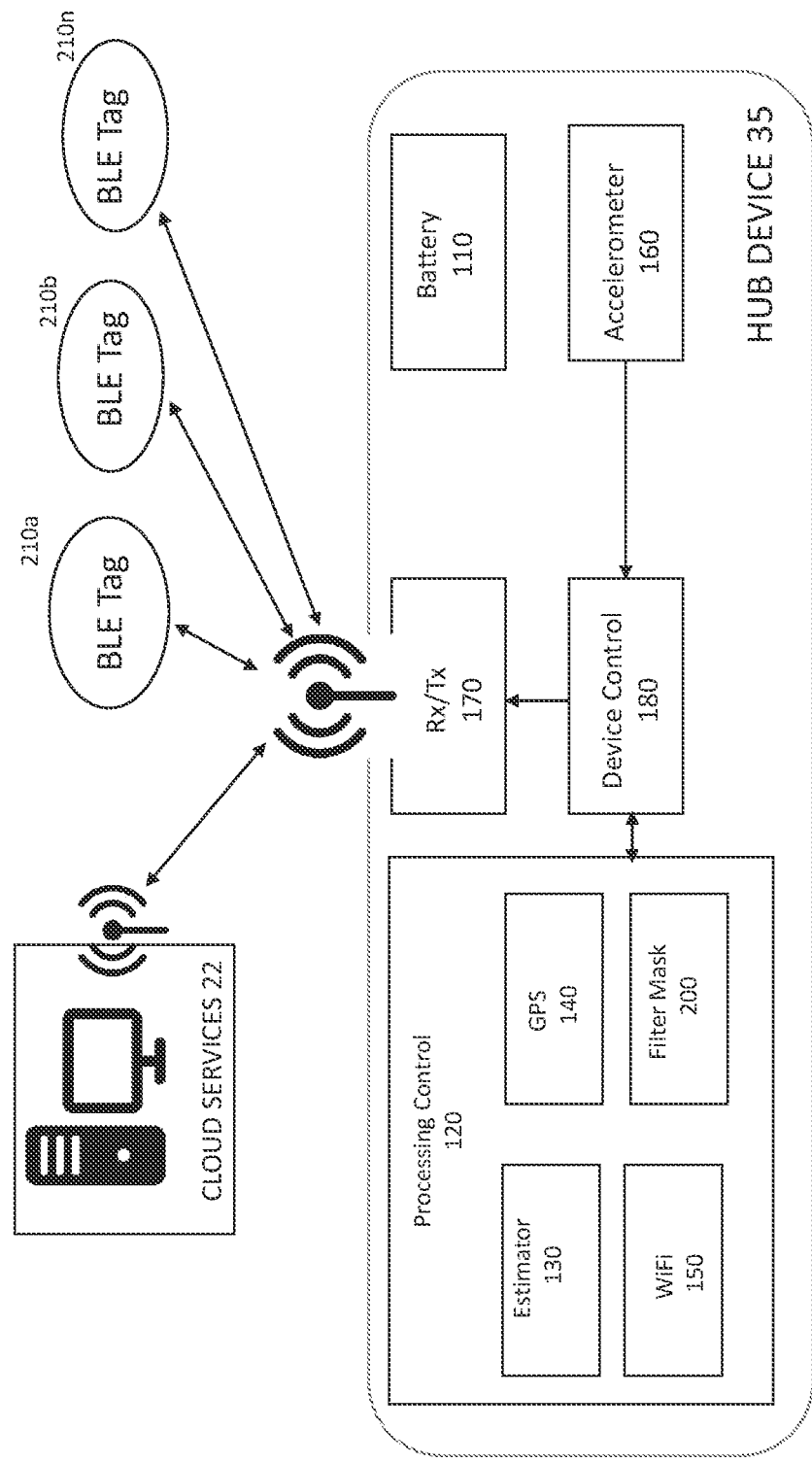
FIG. 4 is an illustration of a Hub Device in communication with a number of BLE Tags and the cloud services portion of a network according to embodiments disclosed herein.

With reference now to FIG. 4, an illustration of a Hub device 35 along with various components associated therewith is presented. In addition, FIG. 4 illustrates the communication of HD 35 with a number of BLE Tags 210 which are in physical proximity to HD 35. HD 35 is also in communication with cloud services 22 as more fully described herein. As discussed above, HD 35 is capable of operating on a local/indoor positioning network wherein HD 35 determines its position through reference to APs and/or RPs via estimator 130 functionality as more fully described in the '436 patent.

Alternatively, and as assumed in the following description, when HD 35 is not located proximate to the local/indoor positioning network, it is able to determine its position through the use of GPS 140 and/or WiFi 150 functionality. Selection and control over location determination is managed by processing control 120. In connection with its operation according to preferred embodiments of the present invention, HD 35 acts as an access point and gateway to connect to surrounding tags 210 and report location and condition information to cloud services 22.

HD 35 also includes battery 110 which powers the device. In addition, HD may include accelerometer which provides movement information to device control 180 which may, in turn, be used by device control 180 to initiate a change in methodology for determining location and/or initiating a wake up to make and report a location determination. Communication by and between HD 35 and tags 210 is via BLE low energy protocols as described above and is managed by RX/TX component 170. Communication by and between HD 35 and cloud services 22 is via wireless backhaul such as wireless backhaul 25 described in connection with FIG. 3A.

Under the control of device control 180, filter mask 200 scans for Bluetooth LE data originating in the proximate area of HD 35 and HD 35 updates its location with each scan. Scan frequency to manage battery 110 usage can be configured, for example, by an administrator user using a terminal associated with cloud services 22. This process is managed by device control 180. Scans can also be initiated based on movement detection via accelerometer 160. In some embodiments, HD 35 can be configured to transmit data only when in motion, as opposed to a periodic scan even when stationary, based upon movement detection by accelerometer 160.

Figure 5:
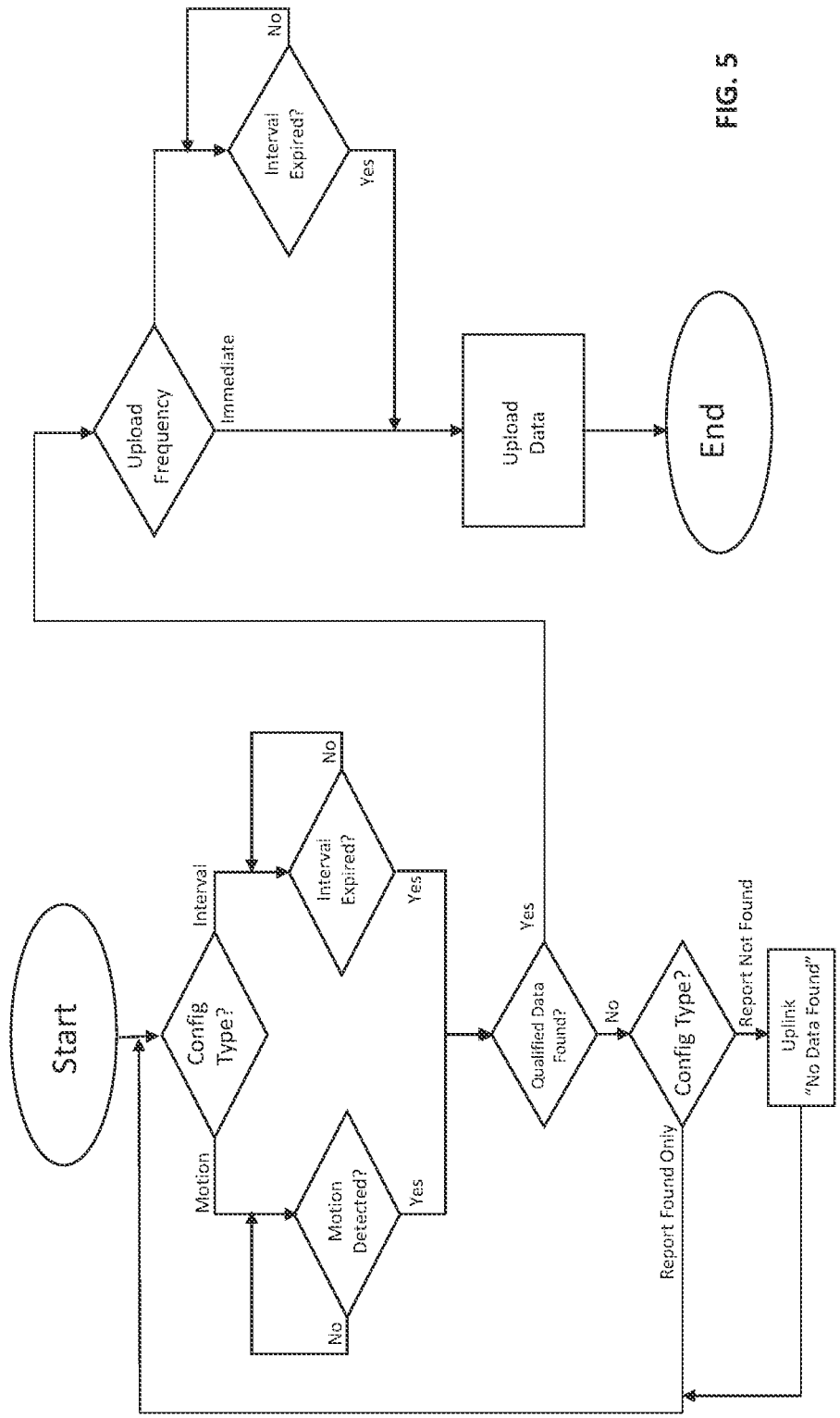
FIG. 5 is a flowchart illustrating the 'digital leash" process of the present invention in a preferred embodiment thereof.
Figure 6:
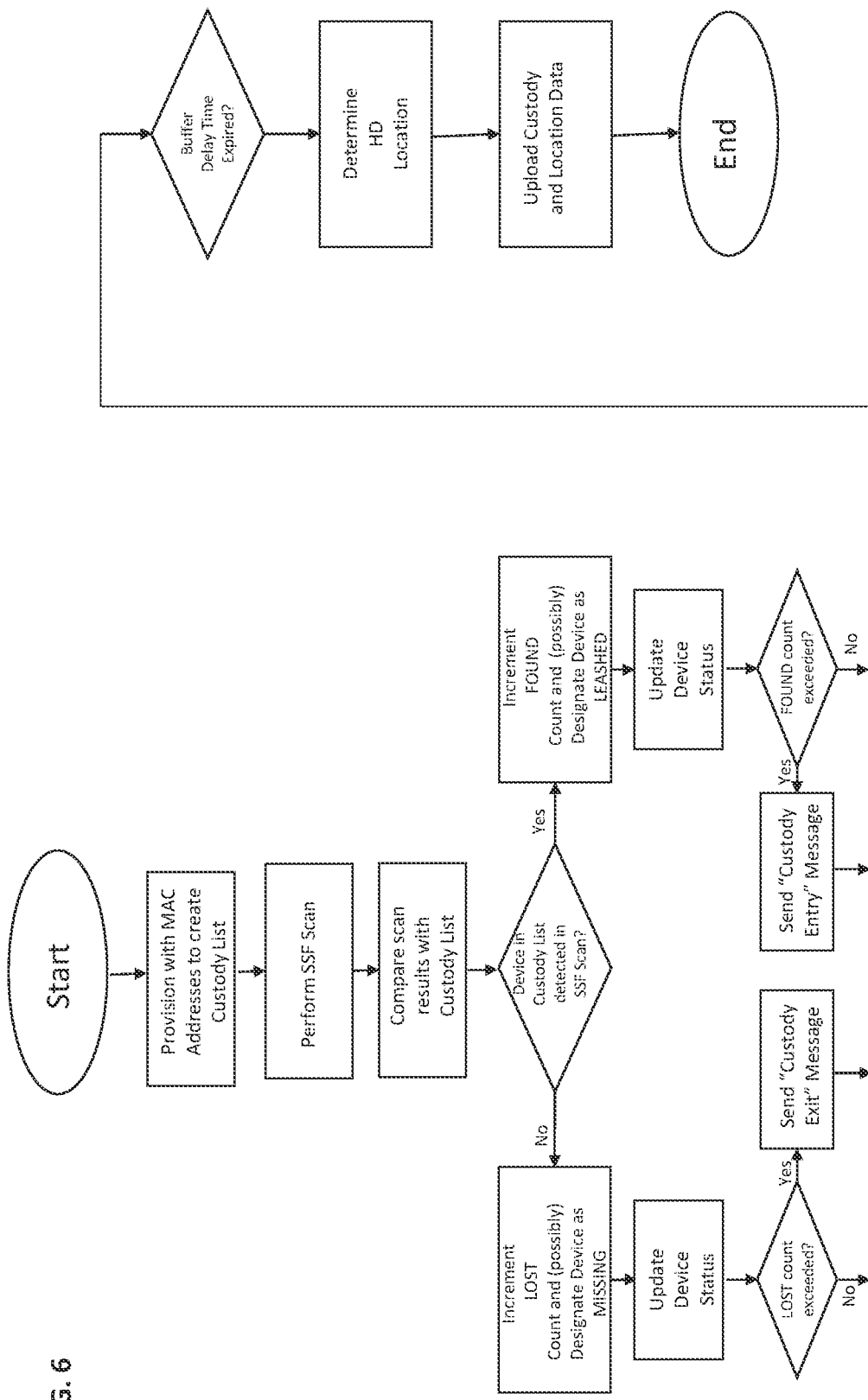
FIG. 6 is a flowchart illustrating the "custody" process of the present invention in one preferred embodiment thereof.

Now, in connection with FIGS. 4-6, a discussion of the filter mask capabilities of the present invention is now provided. FIG. 5 is a flowchart illustrating the "Digital Leash" process implemented by the present invention in preferred embodiments thereof, while FIG. 6 is a flowchart of the "Custody" process implemented by the present invention in preferred embodiments thereof. Both processes are described in connection with HD 35, BLE Tags 210 and related components as illustrated in FIG. 4.

The secure sensor filter (SSF) of the present invention as implemented by filter mask component 200 implements BLE scanning for advertisement data sourced by BLE tags 210 in proximity to HD 35. Filter mask 200 employs a set of pre-defined filters so as to only collect and process advertisement data from devices that match pre-defined filter bit mask requirements. As such, the filter mask may limit processing to a subset of BLE tag devices 210 in proximity. In addition, there may be present in proximity to HD 35, devices other than BLE tags 210 transmitting BLE advertisement data. These other devices may or may not meet the filter mask requirements and therefore will be processed or ignored accordingly.

Configuration of filter mask 200 via a user operating via cloud services 22 can take many forms. Also note that configuration may be performed by a user via any device that allows for the user to input filter mask settings and other administrative preferences so long as such device is in communication with HD (this may be via backhaul 25 or some other communication link). Further, administrative control and configuration settings may be performed via a back office capability which is separate and apart from cloud services 22.

In preferred embodiments, multiple filters on a single HD 35 may be configured with each filter permitting the setting of various filtering characteristics such as, for example, priority (high, low, medium, etc.), minimum signal strength, data refresh rate and various other filter match criteria as more fully discussed below. The following discussion refers to advertising by BLE tags 210. It will be understood by one of skill in the art that the discussion and the scope of the invention can also apply to devices other than BLE tags 210 so long as they are transmitting on applicable frequencies and providing advertising messages in prescribed formats.

In preferred embodiments, when a new BLE tag 210 transmitting advertisements on prescribed frequencies (or refreshed data from a previously registered BLE tag 210) is detected, characteristics of the advertisement are checked against the filters to see if they meet the filter requirements. If requirements are met, the MAC address and advertisement data for the BLE tag 210 is processed by HD 35 (by filter mask component specifically under the control of device control 180). The MAC address and any additional payload data (such as sensor derived data), may be sent to cloud services 22 either immediately or at some later time (possibly in batch with data received from other BLE tags 210) depending on configuration.

As will be readily understood by one of skill in the art, the SSF/filtering capabilities disclosed herein addresses various issues with prior art solutions in that custom filters can be used to only process specified BLE devices that match desired filtering components while ignoring other devices. In a closed/proprietary network, such as where only the previously described indoor positioning network is used (and tags remain stationary or at least located in proximity to APs/RPs), this is not an issue. However, when mobile tags are introduced and they can move around essentially anywhere, including locations where there are many other BLE enabled devices that are not relevant to the use case, it is desirable to ignore this other BLE devices so as to conserve processing power and battery power and to limit the amount of data that is uploaded to cloud services 22 over a limited capacity communications channel.

With reference now specifically to FIG. 5, the "digital leash" process of the present invention, in a preferred embodiment thereof, is now described. This functionality may be enabled/configured on HD 35 as selected by a user. When enabled, only filter matched BLE advertisement data is processed. This provides control with respect to network access as well as to address bandwidth, processing resources and power limitations associated with the HD 35 device so that these are only available to BLE tags 210 meeting the filtering criteria.

At the start of the process, filter mask 200 functionality determines whether the digital leash function is set for initiation of a scan at preset fixed time intervals, upon movement detection with respect to HD 35, or both. Based on this configuration, the filter mask 200 causes HD 35 to be in a "sleep mode" awaiting either or both of detection of motion and/or the elapsing of a preset time interval. When the appropriate trigger is detected, HD 35 scans for BLE advertisement data originating from one or more BLE tags 210. If any advertisements are received, the filtering masks (one or more) are applied to the received advertisement data to determine if that data meets the masking requirements. More detail on this aspect of the process is provided below. If the advertisement meets the masking requirements, then the data is considered qualified data.

Again depending upon how filter mask component 200 is configured, this qualified data can then either be uploaded immediately to cloud services 22 or, alternatively, the data can be queued for a later upload. If the latter, then an upload frequency is also configured and all queued data will be uploaded in batch once the waiting period has expired. By delaying uploads and uploading on a less frequent basis, battery power can be conserved so long as the use case allows for delays in data access.

In the event that either no advertisements are detected during a scan or advertisements received do not meet the filter mask(s), then processing may proceed in either of two ways depending on configuration. A first configuration causes the process to simply do nothing until the next scan while a second/alternative configuration causes the process to send an message to cloud services 22 indicating that no qualified BLE data was received in connection with the particular scan. As described above, transmission of the "No Data Found" message as well as transmission of qualified data by HD 35 to cloud services 22 may occur over backhaul 25 which may be, for example an LTE-m link.

The digital leash aspect of the present invention allows HD 35 to associate BLE tags 210 with HD 35 such that these tags 210 are "leashed" to the particular HD 35. In this way, all such leashed tags 210 can be reported to and understood by cloud services 22 to be in the same location as the location reported by HD 35 unless and until cloud services 22 is informed otherwise. The benefit of this capability is that the location of the leashed tags 210 can "travel" with HD 35 without separate location detection or reporting by such tags 210 to either HD 35 or directly to cloud services 22.

The digital leashing capability combines the SSF functionality with the location determination capabilities of HD 35 to provide location information when the scan events described above are undertaken. In one embodiment, HD 35 may be configured to periodically determine its location (as described above—e.g. WiFi, GPS, local indoor network using AP/RP, CellID) and then immediately perform a scan for BLE tag 210 advertisements. In another embodiment, HD 35 may be triggered to determine its location based on receipt of at least one qualified advertisement meeting filtering requirements. Configurations combining both of these embodiments is also possible (e.g. alternating between location before SSF scan and location after SSF scan).

In all of these embodiments, and as described above, location data and other payload data resulting from SSF scans and location determinations may be immediately uploaded to cloud services 22 upon completion of the scan, or alternatively, data can be queued for later upload based on the configured upload frequency.

Various configuration options exist with respect to the digital leash capabilities and processes of the present invention. As noted above, these configuration options can be set by a user via cloud services 22 or an alternate user terminal which is in direct or indirect communication with HD 35. The following list illustrates exemplary configuration options:

- SCAN RATE—the period of time, in seconds, between successive SSF scans looking for BLE advertisements
- SCAN LENGTH—the length of time, in seconds, during which an SSF scan listens for BLE advertisements
- SCAN TRIGGER—the trigger(s) for initiating a new SSF scan. Examples include time interval (scan rate), detection of motion, detection of HD 35 in a location a predetermined distance away from its location during a previous report of HD 35's location
- SCAN FORCE LOCATION UPDATE?—if yes, a location determination should be performed by HD 35 in each case following an SSF scan
- SEND IF EMPTY?—whether or not to uplink a "No Data Found" message to cloud services 22 if no qualified BLE tag data is found during an SSF scan
- UPLINK BUFFER TIME—the number of seconds between uplinking data to cloud services 22. This number can be zero which reflects immediate upload upon the receipt of qualified data Turning now to FIG. 6, a discussion of the novel "custody" capabilities of the present invention, in preferred embodiments thereof, is now provided. The custody capability of the present invention is an extension of the digital leash feature described above and allows for faster and more power efficient detection by HD 35 of BLE advertising tags 210. In preferred embodiments, HD 35 is provisioned with MAC addresses corresponding to BLE tags 210 initially within the custody of the specific HD 35. In this embodiment, MAC Addresses are set by providing specific MAC Addresses to look for.

The custody list preferably includes all proximate BLE tags 210 that meet the filtering requirements as well as the MAC address associated with each such BLE tag 210. In addition, each BLE tag 210 in the custody list is initially designated as "LEASHED" indicating that such BLE tag 210 is in the custody of the applicable HD 35. In such a way, the reported location of HD 35 can be used as a proxy for the location of all LEASHED tags 210 so long as such tags 210 remain LEASHED and do not change status to MISSING as further described below.

Once initial provisioning of the custody list has occurred, HD 35 will perform an SSF scan. The frequency and timing of these scans may be as described above with respect to configuration options in connection with the digital leash feature of the present invention. Following the SSF scan, the MAC addresses of all detected tags 210 that meet the filtering criteria are compared against the tag MAC addresses in the current custody list. For each tag 210 in the current custody list, it is next determined whether that tag's MAC address was seen during the current scan.

For each of the tags in the custody list that are not seen in scan, two actions occur. First, a LOST counter for that tag 210 is incremented by one and secondly, the status for that particular tag 210 may by changed from LEASHED to MISSING. In some embodiments, this status change may occur in the case that there is a single scan (LOST counter at 1) in which the tag 210 is not found. In other, and preferred embodiments, some minimum number of scans where that same tag 210 is not found must occur before the status of that tag is changed from LEASHED to MISSING. Changes in status from LEASHED TO MISSING are achieved through the transmission of a "Custody Exit" message which is sent to the cloud server 22.

For example, HD may be configured to require three (3) consecutive scans (LOST counter at 3) where that same tag (which is currently marked as LEASHED) is not located before status is changed from LEASHED to MISSING. Other configurations such as differing numbers of scans and changing status even if the tag is not found only in non-consecutive scans are also possible while remaining within the scope and spirit of the present invention.

In the alternative case, where a scan does locate a particular tag 210 currently in the custody list, the FOUND counter for that tag 210 is incremented by one. In the same fashion as described above, the FOUND counter is used along with the preset configuration options to determine when a particular tag 210 in the custody list and currently marked as MISSING should be changed to LEASHED.

In parallel with SSF scans as described above, HD 35 will periodically upload updated custody lists to cloud services 22. The timing of these uploads is as determined by the preset configuration of HD 35 parameters. This is discussed above with respect to the digital leash feature of the present invention. For example, uploading of an updated custody list may occur upon the detection of movement of HD 35 and/or after the passage of some preset time period. At the time of an upload, revised tag 210 statuses since the time of the last upload for all tags 210 in the custody list is made available to cloud services 22. Other possibilities also exist—for example, configurations can dictate (i) immediate uploads anytime the status of at least one tag 210 changes, (ii) uploads at such time as there has been a change in status of at least X tags; (iii) only upon request initiated from cloud services 22; (iv) only on location changes with respect to HD 35, as well as many other possibilities.

In preferred embodiments, just prior to the period upload of updated custody list status, HD 35 may also make a new location determination as to the location of HD 35 itself. As such, the upload to cloud services 22 will also include the most recent location of HD 35 which may also be attributed to each of the tags 210 identified as LEASHED in the updated custody list provided to cloud services.

As will be apparent to one of skill in the art, the aforementioned process provides the ability for a user to track the location of many objects attached to tags 210 which are in proximity to HD 35 regardless of whether or not HD 35 (and tags 210) are in the vicinity of a local network with AP/RPs or not. So long as HD 35 is able to determine a location and is able to communicate with cloud services 22, HD 35 can be anywhere and location and status for all objects to which LEASHED tags 210 are affixed can be tracked and viewed via cloud services 22.

Figure 7:
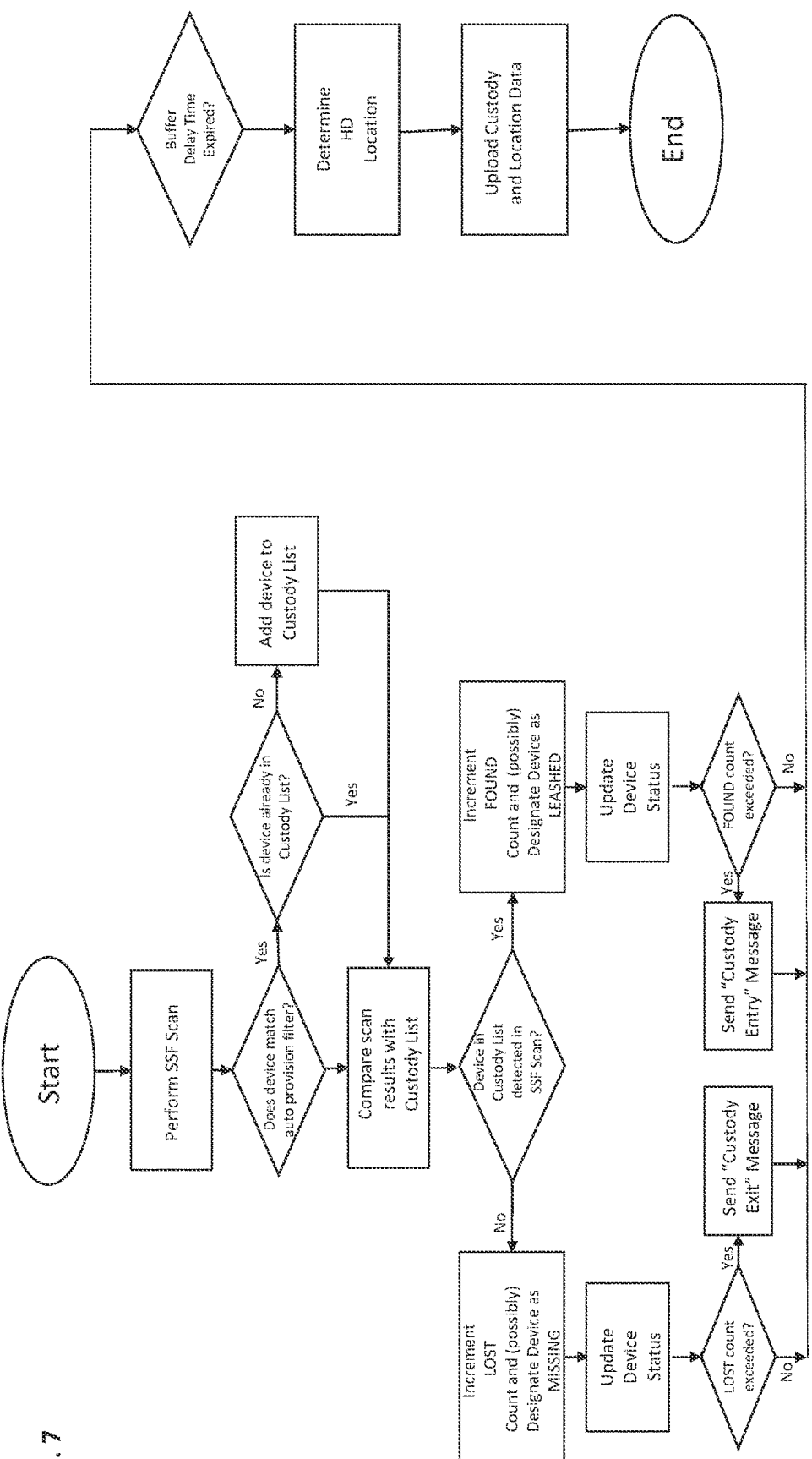
FIG. 7 is a flowchart illustrating the "custody" process of the present invention in a second preferred embodiment thereof.

FIG. 7 is illustrative of a second embodiment for implementing the custody feature of the present invention. In this embodiment, rather than looking for specific MAC ID addresses when performing a scan, specific filtering criteria are specified such that any tag meeting the filtering criteria is added to the custody list. As can be seen in FIG. 7, an auto-provision filter is set up (e.g. only temperature sensors from a particular manufacturer should be added to the custody list) and the scan proceeds to look for those tags providing BLE advertising patterns meeting the specified filtering criteria. If a tag meets the filtering criteria then the system checks to see if the tag is already in the custody list. If it is not, it is added to the custody list. Next, scan results are compared with the custody list.

At this point in the process, at the point where it is determined whether the tag MAC addresses were found in the current scan, the steps associated with the FIG. 7 (second embodiment) proceed the same as that described above with respect to FIG. 6 (the first embodiment).

Alternative embodiments wherein both the features in the FIG. 6 and FIG. 7 embodiments can be combined are also possible. For example, the system could track tags that match a specified MAC ID address and/or one or more specific filtering criteria for auto-provisioning tags to the custody list.

Various configuration options exist with respect to the custody capabilities and processes of the present invention. As noted above, these configuration options can be set by a user via cloud services 22 or an alternate user terminal which is in direct or indirect communication with HD 35. The following list illustrates exemplary configuration options:

ENABLE/DISABLE—enable or disable the custody feature

LOCATION UPDATE—whether or not location updates with respect to HD 35 should be performed whenever there is a custody state change for one or more tags 210

STATUS UPDATE RATE—the trigger(s) for initiating a new custody list status update (e.g. never, heartbeat only, only when there are a minimum of x state changes, only when there is a change in location for HD 35, only when there is movement detected with respect to HD 35)

FOUND COUNT—the minimum number of consecutive (or non-consecutive) scans including the applicable tag 210 MAC Address required before a tag 210 is moved from MISSING to LEASHED status LOST COUNT—the minimum number of consecutive (or non-consecutive) scans without the applicable tag 210 MAC Address required before a tag 210 is moved from LEASHED to MISSING status MINIMUM RSSI—the minimum received signal strength associated with a tag 210 to consider the tag 210 as located during an SSF scan BUFFER TIME—the amount of time, in seconds, after a tag state change before sending a custody list update uplink.

The present embodiments are not limited to the particular embodiments illustrated in the drawings and described above in detail. Those skilled in the art will recognize that other arrangements could be devised. The present embodiments encompass every possible combination of the various features of each embodiment disclosed. One or more of the elements described herein with respect to various embodiments can be implemented in a more separated or integrated manner than explicitly described, or even removed or rendered as inoperable in certain cases, as is useful in accordance with a particular application While the present embodiments have been described with reference to specific illustrative embodiments, modifications and variations of the present embodiments may be constructed without departing from the spirit and scope of the present embodiments as set forth in the following claims.

While the present embodiments have been described in the context of the embodiments explicitly discussed herein, those skilled in the art will appreciate that the present embodiments are capable of being implemented and distributed in the form of a computer-usable medium (in a variety of forms) containing computer-executable instructions, and that the present embodiments apply equally regardless of the particular type of computer-usable medium which is used to carry out the distribution. An exemplary computer-usable medium is coupled to a computer such the computer can read information including the computer-executable instructions therefrom, and (optionally) write information thereto. Alternatively, the computer-usable medium may be integral to the computer. When the computer-executable instructions are loaded into and executed by the computer, the computer becomes an apparatus for practicing the embodiments. For example, when the computer-executable instructions are loaded into and executed by a general-purpose computer, the general-purpose computer becomes configured thereby into a special-purpose computer. Examples of suitable computer-usable media include: volatile memory such as random access memory (RAM); nonvolatile, hard-coded or programmable-type media such as read only memories (ROMs) or erasable, electrically programmable read only memories (EEPROMs); recordable-type and/or re-recordable media such as floppy disks, hard disk drives, compact discs (CDs), digital versatile discs (DVDs), etc.; and transmission-type media, e.g., digital and/or analog communications links such as those based on electrical-current conductors, light conductors and/or electromagnetic radiation.

Although the present embodiments have been described in detail, those skilled in the art will understand that various changes, substitutions, variations, enhancements, nuances, gradations, lesser forms, alterations, revisions, improvements and knock-offs of the embodiments disclosed herein may be made without departing from the spirit and scope of the embodiments in their broadest form.

What is claimed is:

1. A BLUETOOTH Low Energy (BLE) end node (EN) hub moveable between locations, the BLE EN hub comprising:

a locator component for determining positional information associated with said BLE EN hub;

a filtering component for selectively determining whether or not to process information transmitted by each of a plurality of BLE ENs in communication with said BLE EN hub;

a communicator component operatively coupled with said locator component to, in response to at least one BLE EN being included in said plurality of BLE ENs in communication with said BLE EN hub and meeting all filtering requirements dictated by said filtering component, directly transmit an identity of said least one BLE EN in communication with said BLE EN hub to a network server via a wireless backhaul, transmission;

wherein said direct transmission of said identity of said at least one BLE EN in communication with said BLE EN hub corresponds to attribution of said positional information associated with said BLE EN hub to said at least one BLE EN in communication with said BLE EN hub; and wherein for any BLE EN, of said plurality of BLE ENs in communication with said BLE EN hub and not meeting all filter requirements dictated by said filtering component, said BLE EN hub does not transmit any information associated with said any of said BLE ENs, in communication with said BLE EN hub and not meeting all filter requirements, to said network server.

2. The BLE EN hub of claim 1 wherein said communicator component further transmits, to said network server, said positional information of said BLE EN hub attributed to said at least one BLE EN meeting all filtering requirements dictated by said filtering component, thereby enabling said network server to determine an approximate location of said at least one BLE EN in communication with said BLE EN hub.

3. The BLE EN hub of claim 1 wherein said filtering requirements comprise requirements associated with device priority.

4. The BLE EN hub ice of claim 1 wherein said filtering requirements comprise requirements associated with minimum signal strength.

5. The BLE EN hub of claim 1 wherein said filtering requirements comprise requirements associated with data refresh rates.

6. The BLE EN hub of claim 1, wherein:
said locator component comprises (a) a WiFi receiver, in which said positional information associated with said BLE EN hub is further defined as a WiFi network detected by said WiFi receiver, or (b) a global positioning service (GPS) receiver, in which said positional information associated with said BLE EN hub is further defined as GPS coordinates, or (c) a combination of (a) and (b).

7. The BLE EN hub of claim 1, wherein:
each of said locator component and said communicator component are operable in accordance with instructions therefor configured for storage on and execution from a non-transitory computer readable medium.

8. The BLE EN hub of claim 1 wherein at least one of said at least one BLE ENs meeting all filtering requirements dictated by said filtering component is leashed to said BLE EN hub.

9. The BLE EN hub of claim 8, wherein said filtering component is operable to scan for BLE ENs within range of said BLE EN hub.

10. The BLE EN hub of claim 8 wherein all of said at least one BLE ENs in communication with said BLE EN hub and meeting all filtering requirements dictated by said filtering component are presumed to be at a location corresponding to said BLE EN hub unless and until said BLE EN hub reports otherwise.

11. The BLE EN hub of claim 8 further comprising a custody list database containing identifying information associated with individual BLE ENs in a proximity of said BLE EN hub.

12. The BLE EN hub of claim 11 wherein said custody list database is initially provisioned based upon specific MAC ID addresses.

13. The BLE EN hub of claim 11 wherein said custody list is initially provisioned based upon specific filtering criteria.

14. The BLE EN hub of claim 9 wherein said identity of said at least one BLE EN in communication with said BLE EN hub comprises a MAC address associated with said at least one BLE EN in communication with said BLE EN hub.

15. A method of operating a BLUETOOTH Low Energy (BLE) end mode (EN) hub moveable between locations, the method comprising:
determining positional information associated with said BLE EN hub;
selectively determining whether or not to process information transmitted by each of a plurality of BLE ENs in communication with said BLE EN hub;
directly transmitting, in response to at least ne BLE EN being included in said plurality of BLE ENs in commination with said BLE EN hub and meeting all filtering requirements dictate by a filtering component, an identity of said at least one BLE EN in communication with said BLE EN hub to a network server via a wireless backhaul, transmission;
wherein said directly transmitting said identity of said at least one BLE EN in communication with said BLE EN hub corresponds to attribution of said positional information associated with said BLE EN hub to said at least one BLE EN in communication with said BLE EN hub; and
wherein for any BLE ENs, of said plurality of BLE ENs in communication with said BLE EN hub and not meeting all filter requirements dictated by said filtering component, said BLE EN hub does not transmit any information associated with said any of said BLE ENs, in communication with said BLE EN hub and not meeting all filter requirements, to said network server.

16. The method of claim 15 wherein said BLE EN hub further transmits, to said network server, said positional information of said BLE EN hub attributed to said at least one BLE EN in communication with said BLE EN hub and meeting all filtering requirements dictated by said filtering component, thereby enabling said network server to determine an approximate location of said at least one BLE EN in communication with said BLE EN hub.

17. The method of claim 15 wherein said filtering requirements comprise requirements associated with device priority.

18. The method of claim 15 wherein said filtering requirements comprise requirements associated with minimum signal strength.

19. The method of claim 15 wherein said filtering requirements comprise requirements associated with data refresh rates.

20. The method of claim 15 wherein at least one of said at least one BLE ENs meeting all filtering requirements dictated by said filtering component is leashed to said BLE EN hub.

21. The method of claim 20 wherein all of said at least one BLE ENs in communication with said BLE EN hub and meeting all filtering requirements dictated by said filtering component are presumed to be at a location corresponding to said BLE EN hub unless and until said BLE EN hub reports otherwise.

22. The method of claim 20 further comprising storing identifying information associated with individual BLE ENs, of said plurality of BLE ENs in communication with said BLE EN hub, in a proximity of said BLE EN hub.

\* \* \* \* \*